US008990734B2

(12) United States Patent
Woycik et al.

(10) Patent No.: US 8,990,734 B2
(45) Date of Patent: Mar. 24, 2015

(54) METHOD AND ASSEMBLY FOR DISPLAYING MENU OPTIONS

(71) Applicant: Nextep Systems, Inc., Troy, MI (US)

(72) Inventors: Thomas Woycik, Troy, MI (US); Kevin Varga, Troy, MI (US); Joseph Maslanka, Troy, MI (US)

(73) Assignee: Nextep Systems, Inc., Troy, MI (US)

( * ) Notice: Subject to any disclaimer, the term of this patent is extended or adjusted under 35 U.S.C. 154(b) by 188 days.

(21) Appl. No.: 13/651,852

(22) Filed: Oct. 15, 2012

(65) Prior Publication Data

US 2014/0109013 A1    Apr. 17, 2014

(51) Int. Cl.
*G06F 3/048* (2013.01)

(52) U.S. Cl.
USPC ............................................... 715/841

(58) Field of Classification Search
None
See application file for complete search history.

(56) References Cited

U.S. PATENT DOCUMENTS

| 5,235,509 | A | 8/1993 | Mueller et al. |
| 5,353,219 | A | 10/1994 | Mueller et al. |
| 5,818,437 | A | 10/1998 | Grover et al. |
| 8,719,086 | B1 * | 5/2014 | Gala et al. .................. 705/14.25 |
| 2004/0143512 | A1 * | 7/2004 | Sturr, Jr. ........................ 705/26 |
| 2004/0268451 | A1 | 12/2004 | Robbin et al. |
| 2006/0010037 | A1 * | 1/2006 | Angert et al. ................... 705/15 |
| 2007/0088620 | A1 * | 4/2007 | Tengler et al. .................. 705/26 |
| 2009/0228836 | A1 * | 9/2009 | Silva ............................. 715/841 |
| 2010/0281374 | A1 * | 11/2010 | Schulz et al. .................. 715/723 |
| 2011/0161882 | A1 | 6/2011 | Dasgupta et al. |
| 2012/0096405 | A1 * | 4/2012 | Seo ................................ 715/825 |

OTHER PUBLICATIONS

Non Final Office Action for U.S. Appl. No. 14/289,073 dated Dec. 4, 2014.

* cited by examiner

*Primary Examiner* — William Bashore
*Assistant Examiner* — Rayeez Chowdhury
(74) *Attorney, Agent, or Firm* — Harness, Dickey & Pierce, P.L.C.

(57) ABSTRACT

A method for controlling a food ordering terminal assembly includes dividing a display into first and second display portions. The method includes dividing the second display portion into a plurality of sections including a first section and a second section immediately adjacent the first section. The method includes introducing a first set of food items for selection in the first section. The method includes, in response to selection of one of the first set of the food items, moving the first set of the food items across the second display portion from the first section to the second section such that (i) a second set of food items appears for consideration and selection in the first section, and (ii) in the second section, the first set of the food items remains visible and available for reselection.

15 Claims, 11 Drawing Sheets

METHOD AND ASSEMBLY FOR DISPLAYING MENU OPTIONS

A portion of this disclosure of this patent document contains material which is subject to copyright protection. The copyright owner has no objection to the facsimile reproduction by anyone of the patent document or the patent disclosure, as it appears in the United States Patent and Trademark Office patent files or records, but otherwise reserves all copyrights whatsoever.

BACKGROUND ART

1. Field of the Invention

The invention relates to electronic terminals for ordering and/or purchasing items. More particularly, the invention relates to electronic terminals designed to facilitate the ease of use thereof when ordering and/or purchasing items.

2. Description of the Related Art

Point of Sale "POS" systems provide a means by which ordering and purchasing transactions can be carried out electronically at the store or other venue where goods or services are supplied. Many of these POS systems are used by the merchants themselves to consummate transactions with their customers. Cash registers were the first POS systems. Now most POS systems are computerized and many have dedicated touch screens designed particularly for that establishment using the POS system. At a minimum, the POS system generally includes a processor-based terminal device along with software running on the processor to carry out the functions of the POS system. One or more remote computers are typically connected to the terminal by, for example, a computer network to enable communication between the terminal and the computer(s) for the purpose of carrying out the transactions.

In many systems currently being used, the POS system includes a touch screen input device allowing the operator to press a virtual button that is programmed for a particular item or type of transaction. These buttons are typically arranged in a non-intuitive manner which requires a great deal of training to understand, locate, and utilize during a transaction. Oftentimes, these touch screen POS systems are developed with a sense of a business function. Therefore, the virtual buttons are not programmed in a manner which is the most conducive for quickly completing a transaction.

Such organization that is not based on completing a transaction delays delivery of the goods being provided and increases the amount of time and expense in training employees to operate the POS systems.

SUMMARY OF THE INVENTION

A food ordering terminal assembly for ordering selected food items from available items includes a processing unit for processing food orders. A memory unit is electrically connected to the processing unit for storing data therein. An input device is electrically connected to the processing unit to enter the food order for selected food items. A display is operatively connected to the processing unit to display the available items, the selected food items, and a tally of costs associated with the selected food items. The display includes a first display portion for displaying the tally costs and a second display portion for displaying the available items. The first display portion is fixed with respect to the display. Available items are displayed in a second display portion and cascade across the second display portion not occupied by the first display portion as items are selected for purchase. The second display portion moves in response to the selection of available items such that new available items and choices appear for consideration and selection as the selected items and the available items associated with the selected items are removed from the second display portion.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

The invention relates to a POS system or a self-service kiosk used to purchase items. The invention relates to using the POS system or the self-service kiosk to purchase items that are sequentially ordered. This typically occurs in a restaurant environment where a customer or operator is selecting items of a meal or meals from a menu. Therefore, the remainder of this disclosure will refer to the POS system and the self-service kiosk collectively as a food ordering terminal. It should be appreciated by those skilled in the art that this invention may be used outside of the food and restaurant arts.

Figure 1:
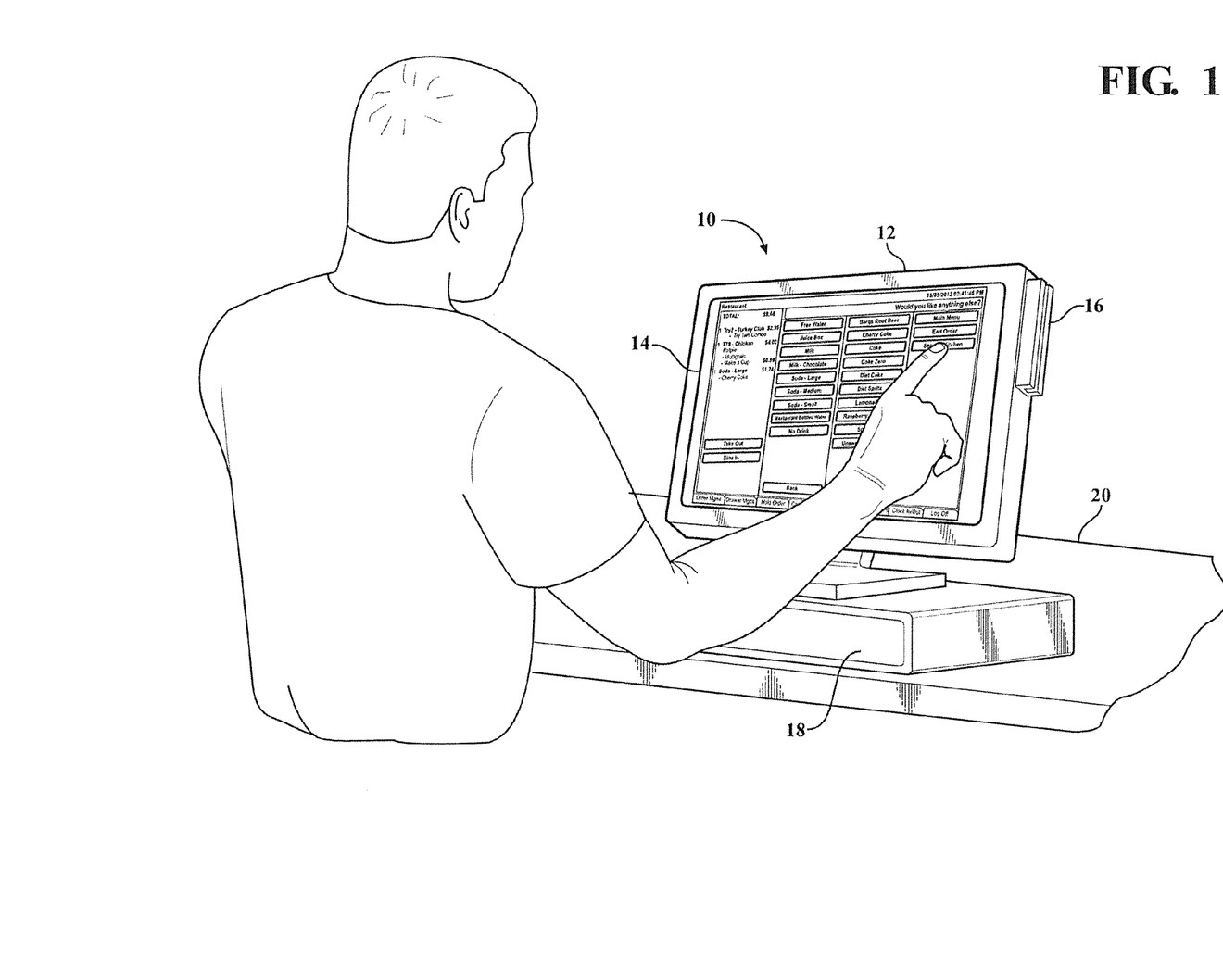
FIG. 1 is a perspective view of a POS system incorporating one embodiment of the invention.

Referring to FIG. 1, a food ordering terminal is generally indicated at 10. The food ordering terminal 10 is depicted as a POS terminal having a monitor 12, a touch screen 14, a card scanner 16, and a drawer 18 for cash, paper coupons and the like. The monitor 12 is set on or is mounted onto a counter 20 and the cash drawer 18 is mounted therebelow. It should be appreciated by those skilled in the art that the touch screen 14 may be replaced with a standard viewing screen and a keyboard (not shown). The food ordering terminal assembly 10 allows one to order selected food items from available items. A printer 19 (FIG. 2) is used to generate receipts and, in some instances, menu numbers to assign a menu order to a particular number to facilitate retrieval of the proper meal.

Figure 2:
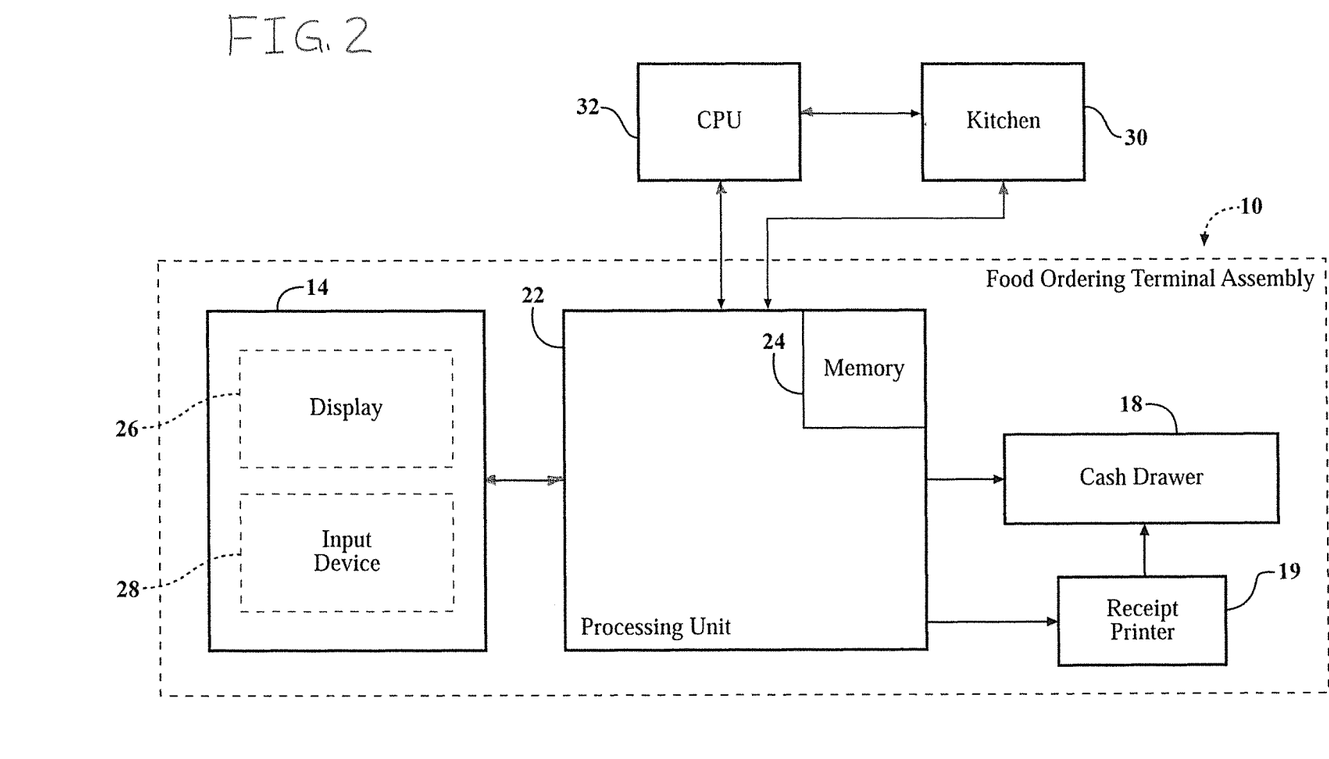
FIG. 2 is a block diagram of the electronics incorporated into the POS system of FIG. 1.

Referring to FIG. 2, the food ordering terminal assembly 10 is shown to include a processing unit 22. The processing unit 22 processes food orders. In processing food orders, the processing unit 22 receives data that is stored in memory 24 to generate the listings of available items, and receives input from the touch screen 14, including a display 26 and an input device 28, discussed in greater detail subsequently. The processing unit 22 also controls the opening and closing of the cash drawer 18 and finally the processing unit 22 communicates with the kitchen 30 and/or a central processing unit 32 to facilitate the fulfillment of the food order being placed. The central processing unit 32 may be local or it may be remote depending on the establishment utilizing the food ordering terminal assembly 10. If the establishment utilizing the food ordering terminal assembly 10 is a single location establishment having a single food ordering terminal assembly 10, many of the functions of the central processing unit 32 may be assumed by the processing unit 22.

The printer 19 is plugged into processing unit 22, typically through a USB or serial port. The cash drawer 18 may be plugged into the processing unit 22, either directly or indirectly, via an RJ11 port (not shown) found on the printer 19. In the latter situation, when the cash drawer 18 is to be opened, a command is sent to the printer 19 and the RJ11 port changes state to open the cash drawer 18.

The touch screen 14 is shown to have a display 26 and an input device 28. The display 26 is illuminated with options of the available items from which an operator may select to create a food order. The input device 28 is typically overlaid on the display 26 to create what is commonly referred to as a touch screen 14. The touch screen 14 utilizes an input device 28 that is a capacitive overlay so that when an operator touches an item that is displayed on the display 26, the input device 28 registers that entry as being the one touched by the operator of the food ordering terminal assembly 10. Other technologies that may be used to create a touch screen 14 include, but are not limited to, resistive, infrared, acoustic pulse, and surface acoustic wave technologies.

Figure 3:
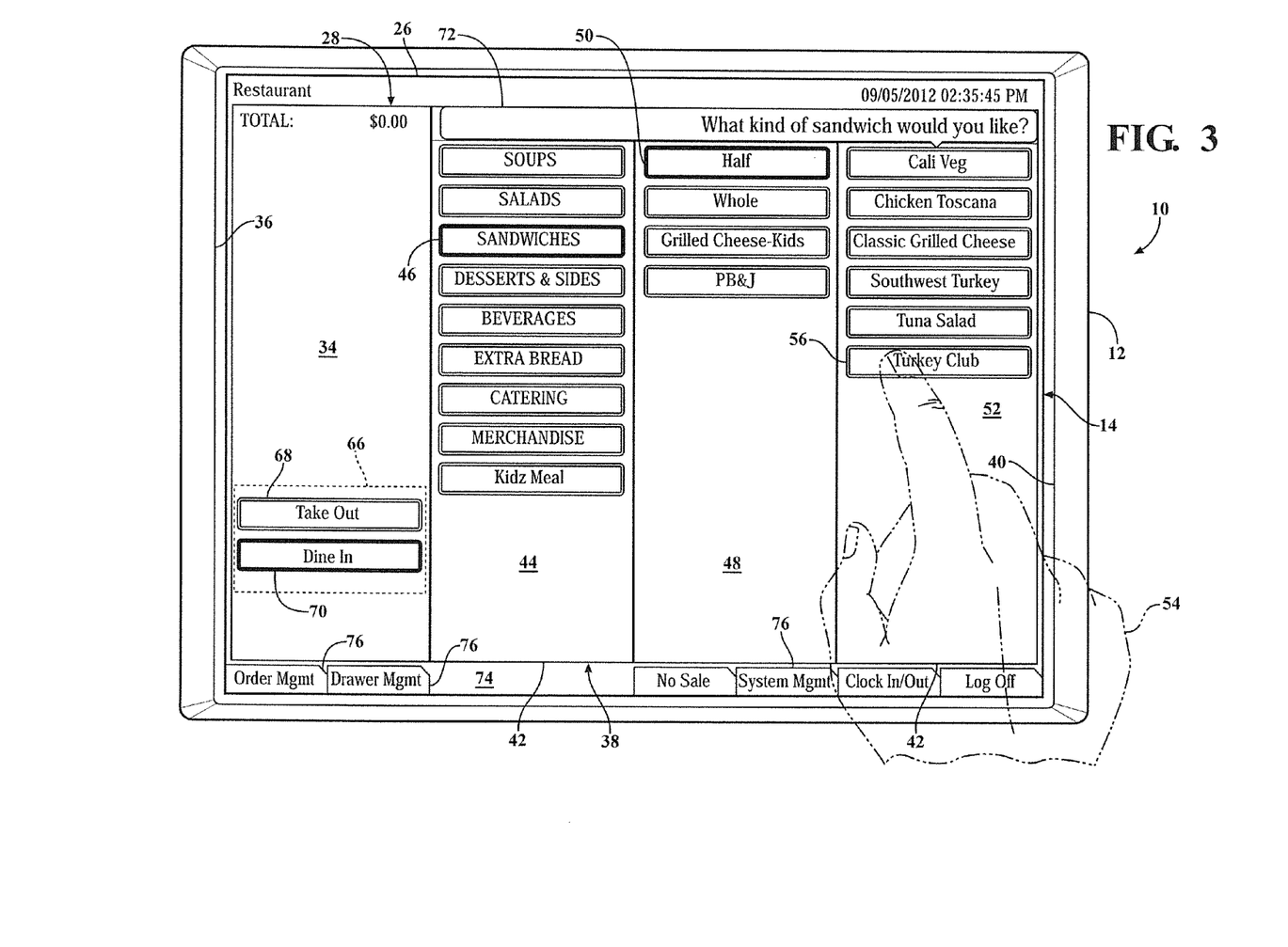
FIGS. 3 through 10 show a sequence of screen shots of a display for a POS system incorporating one embodiment of the invention.

Referring to FIG. 3, the monitor 12 is shown with the touch screen, generally shown at 14. The display component 26 is shown extending across the entire touch screen 14, whereas the input device component 28 is shown to be a portion of the display component 26. It should be appreciated by those skilled in the art that the input device component 28 may extend across the entire display component 26 and will be coextensive in many embodiments. The display component 26 is operatively connected to the processing unit 22 (as shown in FIG. 2) and displays the available items for purchase. The display component 26 also displays the selected food items and a tally of costs associated with the food items.

The display component 26 includes a first display portion 34. The first display portion 34 displays the tally of costs and a running total for the costs associated with the selected food items. As is shown in FIG. 3, a complete selected food item has yet to be selected and the total cost is represented as $0.00. Referring to FIGS. 4 through 10, the tally and total cost for the selected food items is shown to grow with each selection. The first display portion 34 is shown to be approximately one quarter of the total display component 26. This percentage may vary depending on the execution of a particular embodiment of the invention. The first display portion 34 is also fixed with respect to the display component 26 in a specific portion of the display component 26. In the embodiment shown, the first display portion 34 occupies the left-most portion of the display component 26 and is disposed adjacent a first side 36 of the display component 26. Therefore, in the embodiment shown, the first side 36 is the left side of the monitor 12.

The display component 26 also includes a second display portion 38 disposed between the first display portion 34 and a second side 40 of the display component 26, which is the right side of the monitor 12 in the embodiment shown in the Figures. The second display portion 38 displays the available items that may be selected by an operator of the food ordering terminal assembly 10. As selections are made, the available items found within the second display portion 38 will move across the display component 26 in response to the selection of the available items such that new available items and choices appear for consideration and selection as the selected items and the available items associated with those selected items are moved and/or removed from the second display portion 38. The movement and subsequent removal of available items and selected items on the display component 26 will be discussed in greater detail subsequently.

The second display portion 38 is divided into a plurality of sections 42. Each of the plurality of sections 42 includes a portion of the available items categorized such that one choice of these available items in one of the plurality of sections is chosen over the others in the one of the plurality of sections. In the embodiment shown in the Figures, each of the plurality of sections is actually a column extending parallel to the first display portion 34. The items to be selected in each of these sections or columns 42 are divided into categories. These categories can include any wide variety of available items for selection, the creation of which will be discussed in greater detail subsequently.

With the example starting in FIG. 3, the left-most column 44 of the second display portion 38 has a choice between soups, salads, sandwiches, desserts & sides, beverages, extra bread, catering, merchandise, or a "kidz meal." These options are types of things that may be selected to start the process of ordering a meal. When selected, a border 46 is highlighted. Alternatively, instead of the border 46 being highlighted, the background color of the button highlighting the item may change colors. In the example shown, the operator of the food ordering terminal assembly 10 has ordered a sandwich because the border 46 around the sandwich option has been highlighted.

The very next column to the right of the left-most column 44 is a middle column 48. It is shown here by a highlighted border 50 that the half sandwich selection has been made. It should be noted that this "category" of available items includes "Half," "Whole," "Grilled Cheese-Kids" and "PB&J," which illustrates how a grouping in a category can be created—or subsequently modified—to include seemingly unrelated items. Additionally, if a particular establishment chooses to categorize more items in a particular category than can fit in any one column (44, 48 or 52), the method will divide them into multiple column categories and they would be displayed together (appear together and disappear together). The menu flow is very flexible.

In a right-most column 52 the type of sandwich that is being ordered is being selected. It is in this right-most column 52 that the order is being selected by the operator of the food ordering terminal assembly 10. A right hand 54, shown in phantom, is selecting the turkey club option. Because the turkey club option has not yet been selected in this example shown in FIG. 3, its border 56 is not highlighted.

In one embodiment of the invention, the left-most column 44 and the middle column 48 may have available items showing with the most likely chosen of the available items already preselected. This will save time and allow the operator to immediately move his or her hand 54 to the right-most column 52 and make the next selection. In another embodiment, none of the available items are preselected and the operator will manually make all of the selections.

Figure 4:
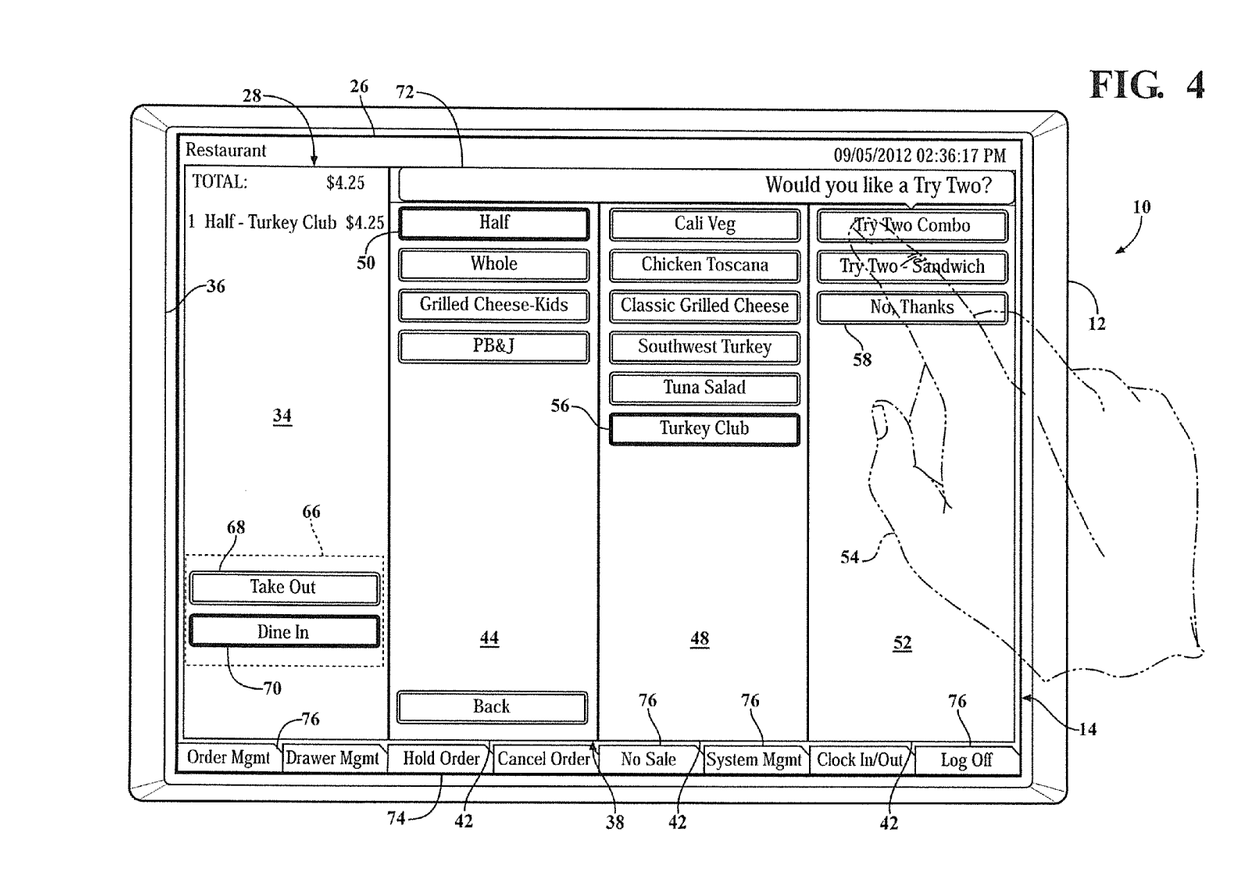

Once the kind of sandwich has been selected, the second display portion 38 changes in appearance. The second display portion 38 changes in appearance because all of the options that were previously shown on the second display portion 38 as available items were completed by selecting an item from each of the plurality of sections 42. Referring to FIG. 4, the plurality of sections 42 has changed in that the options in the left-most column 44 have been removed from the second display portion 38. The available items in the middle column 48 of FIG. 3 have been moved to the left-most column 44 (FIG. 4) and a new set of available items is presented in the right-most column 52. Continuing from the previously example, it is noted that the middle column 48 in FIG. 4 includes a selection of the turkey club sandwich because the turkey club border is now highlighted.

In the right-most column 52 of FIG. 4, a new subset of available items is now presented. One of the items is the option to skip this subset of additional items by selecting the "No Thanks" button 58. Therefore, for purposes of this disclosure, a selection is defined as either a selection of an item from the available items provided or a decision to select none of the items provided in the subset of available items.

Referring to the first display portion 34 in FIG. 4, it is noted that the tally has changed because the operator of the food ordering terminal assembly 10 had completed the selection process enough to note that one item was selected, e.g., a half of a turkey club sandwich.

Because one of the selections is no longer viewable on the display component 26 a back button 60 appears in the leftmost column 44. If the operator of the food ordering terminal assembly 10 would want to see what was selected prior to those items that are shown as selected on the display component 26, the operator would select the back button 60 to see the historical selections and optionally reselect new items.

Figure 5:
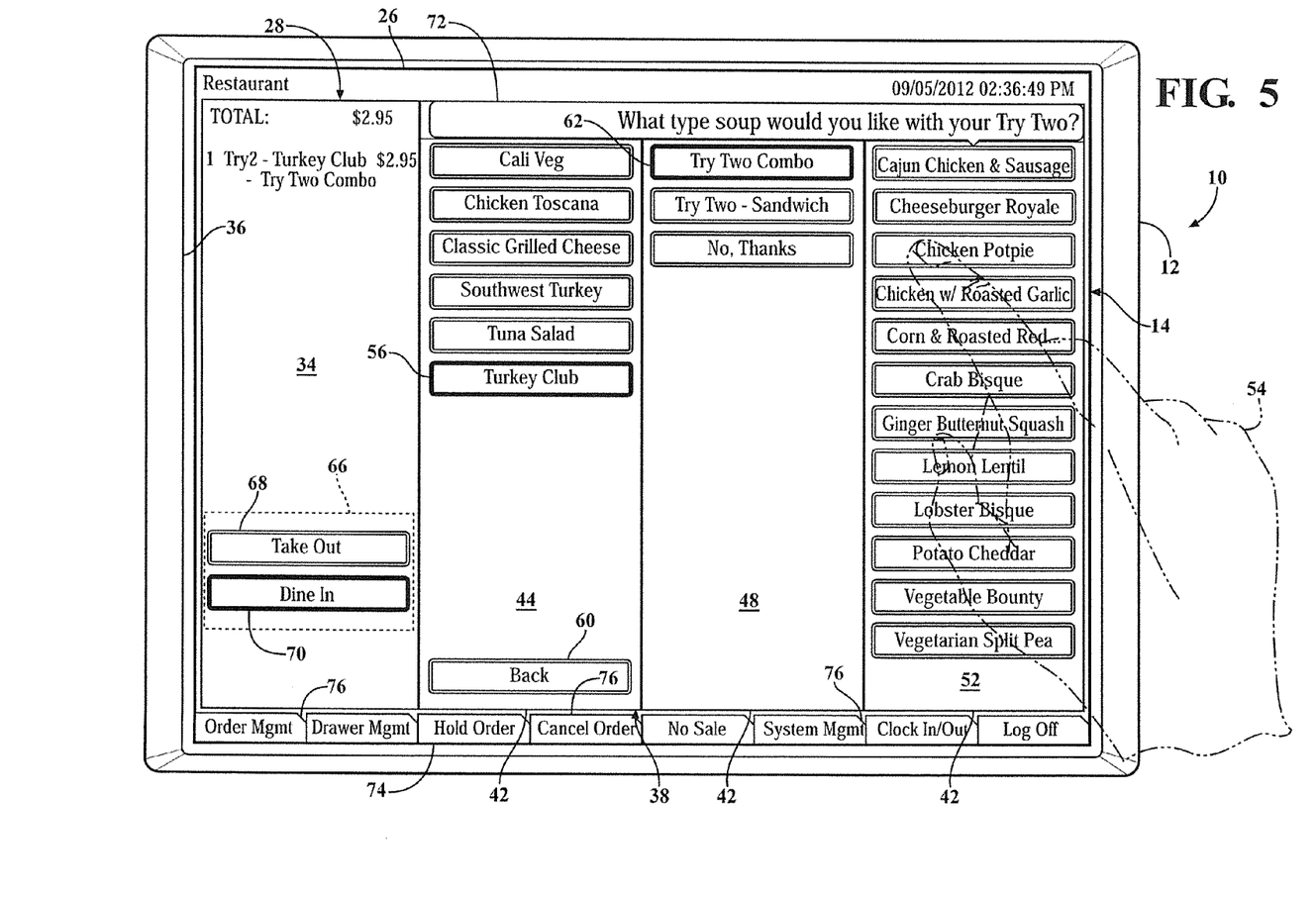

Once the operator has selected one of the available items in the right-most column 52, the available items in the second display portion 38 change again. The options found in the various plurality of sections 42 cascade from right to left allowing the introduction of a new set of available items to be selected in the right-most column 52. Because the operator shows the "Try Two Combo" button, its border 62 is highlighted and the operator may then choose what type of soup to go with the half turkey club sandwich.

Figure 6:
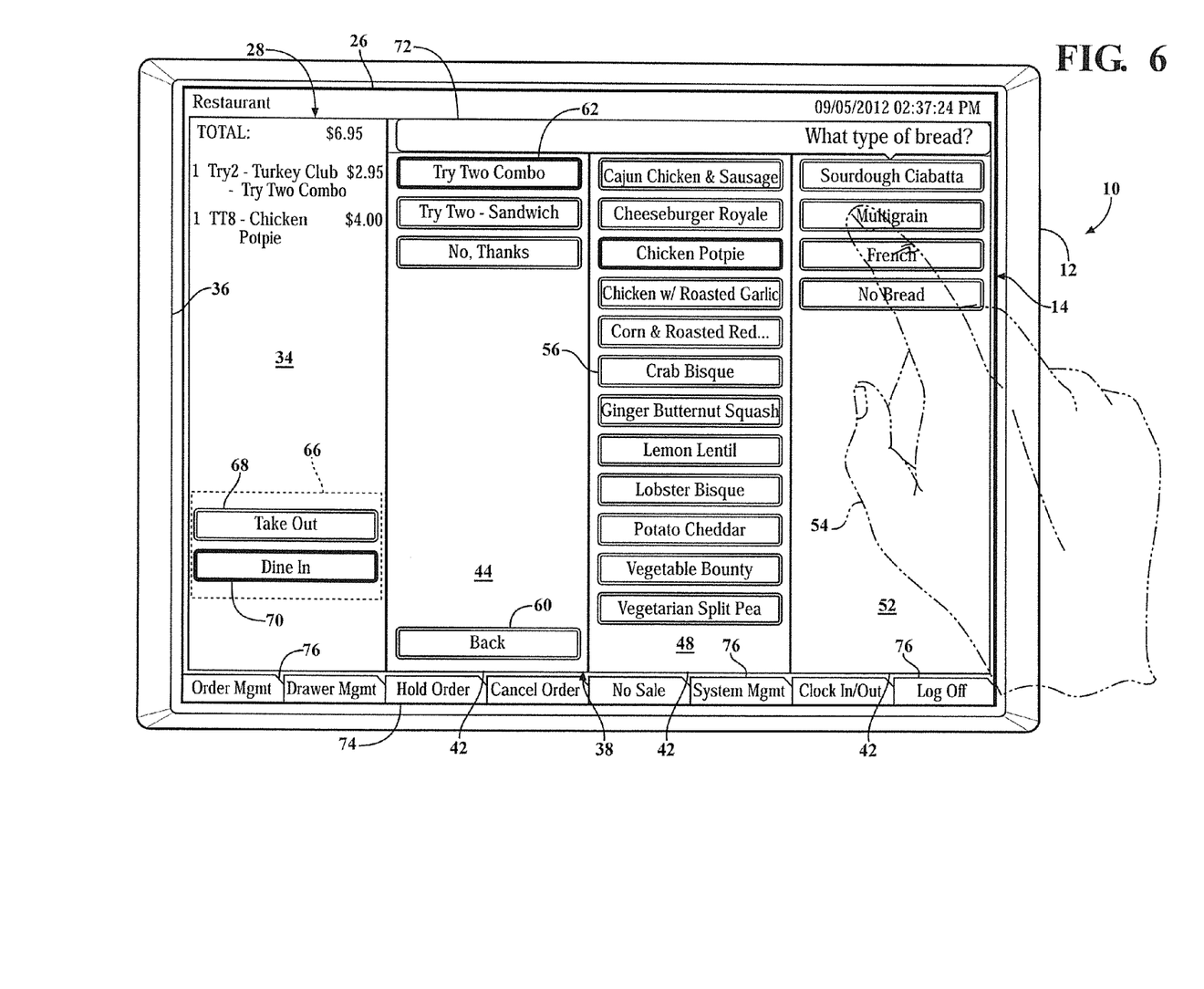
Figure 7:
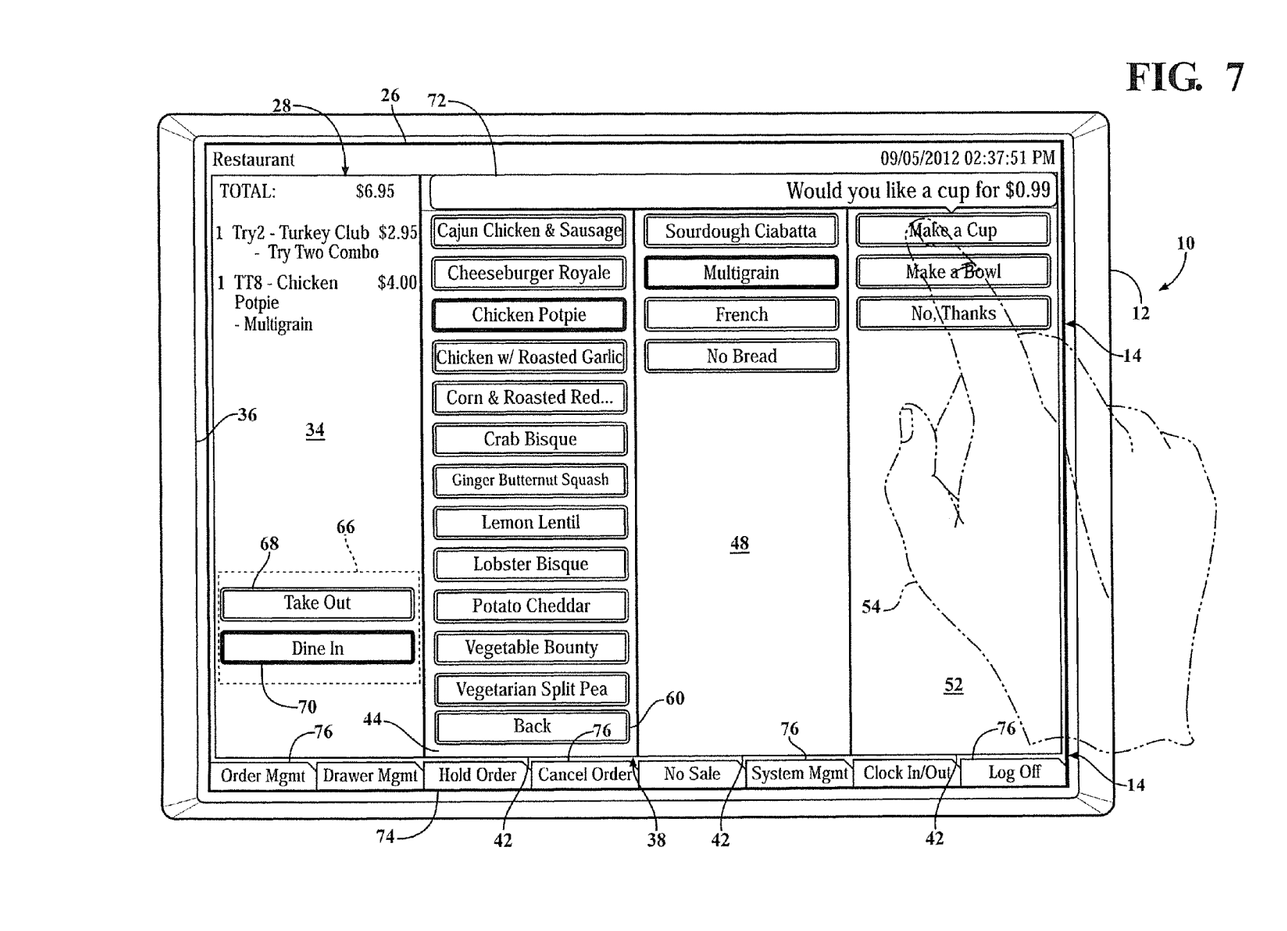
Figure 8:
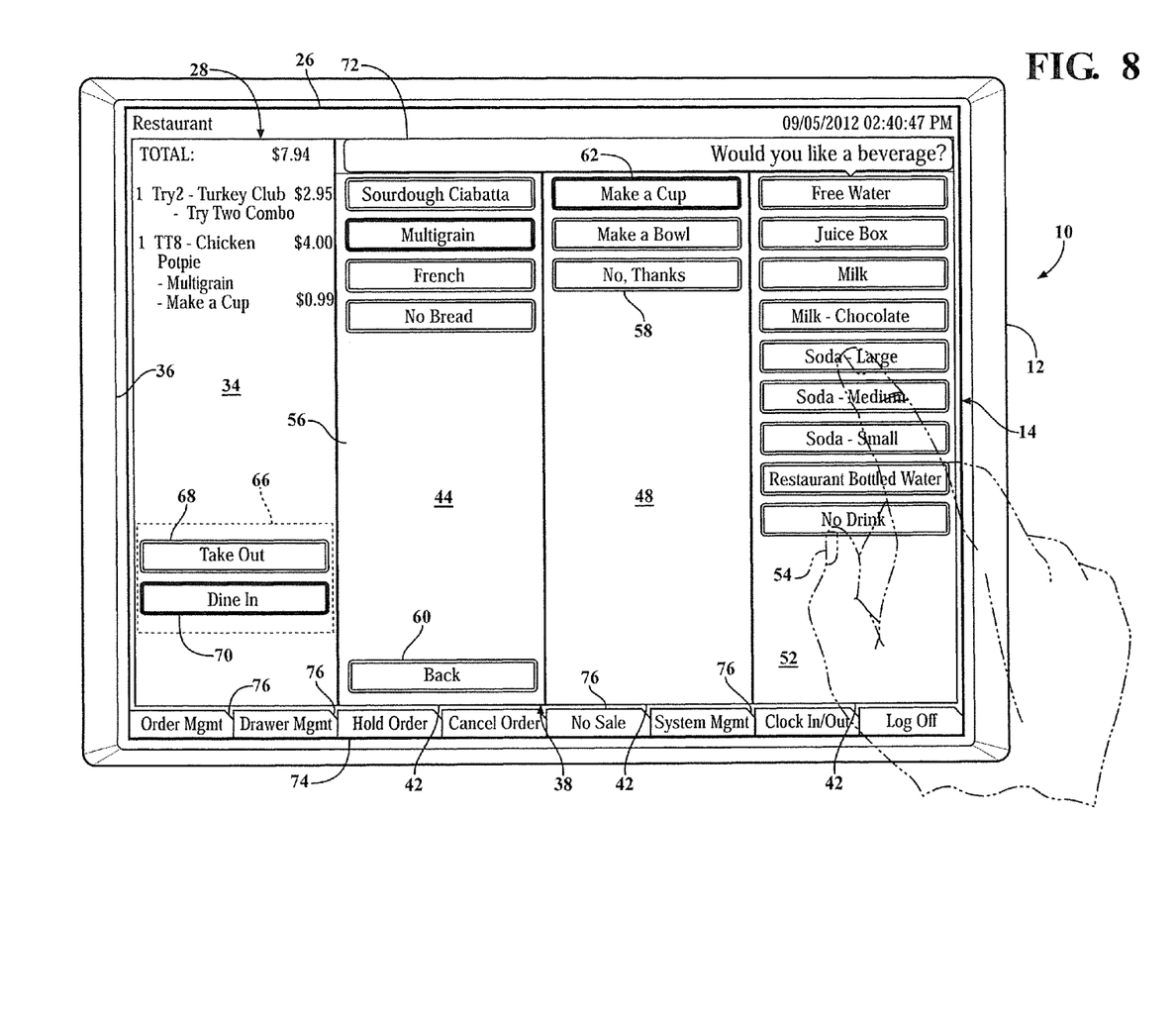
Figure 9:
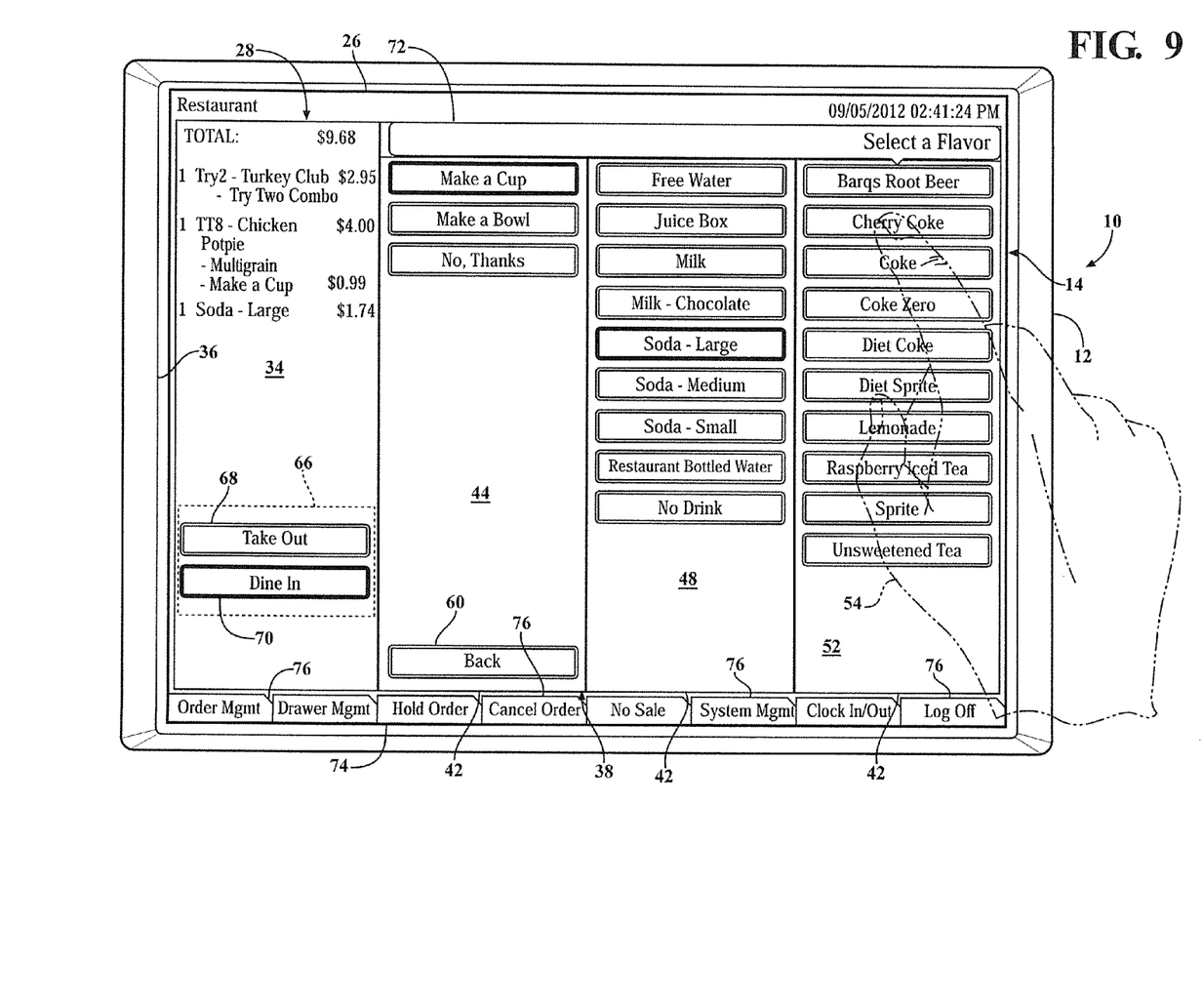

Referring to FIG. 6, the available items shown on the second display portion 38 have again cascaded from right to left removing the available items in the left-most column 44 and providing new available items in the right-most column 52. Continuing with this example, the operator has the opportunity to select a type of bread to accompany the meal in FIG. 6. FIGS. 7-9 show additional cascading of available items representative of the types of selections that an operator would make when either the operator or a customer is selecting items to purchase for a meal. In FIG. 7, a quantity is being selected as opposed to an additional item. The operator chooses whether to order a cup or a bowl of soup. Therefore, it should be appreciated by those skilled in the art that an item as defined in this disclosure is either an item for purchase of an instruction regarding the size of an item being purchased. As such, selecting the "MAKE A CUP" button 62 is considered selecting an item even though it is actually quantifying an item previously selected.

Figure 10:
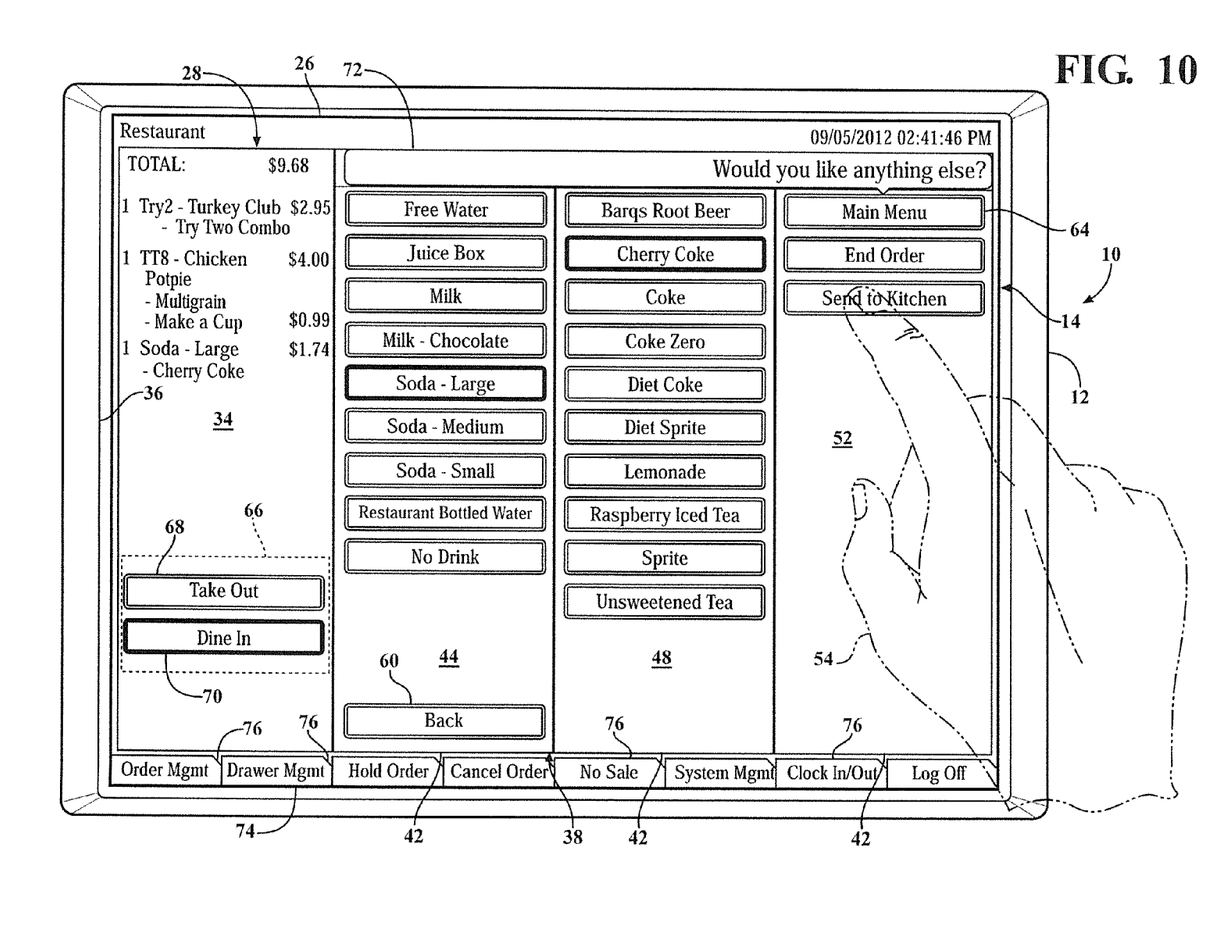

In FIG. 10, the cascading of available items has come to the conclusion of the meal ordering options. Therefore, the available items listed in the right-most column 52 are to either end the order, send the order to the kitchen, or return to the main menu for some additional purchases. Assuming the order is ended and sent to the kitchen, the operator would then find a total cost for the meal in the first display portion 34. If another person were to order in the same order as that being taken in the example shown in FIGS. 3 through 10, the "MAIN MENU" button 64 may be selected allowing the next person to enter his or her order.

All through this process, there may be an overriding decision that must be made regardless of where the customer is in ordering his or her items for purchase. Such selections may be found in a selection window 66 allowing a selection to be made independent from the available items at any time during the ordering of the selected food items. The selection window 66 is found in the first display portion 34 as the first display portion 34 does not change through the ordering process. In the example shown, the selection window includes two buttons, they being a "Take Out" button and a "Dine In" button, 68, 70 respectively.

The food ordering terminal assembly 10 also includes a third portion 72 of the display component 26. The third display portion 72 provides assistance in the ordering of the selected food items. The third display portion 72 is stationary within the display component 26. The third display portion 72 may provide prompts to assist the operator of the food ordering terminal assembly to facilitate the ordering process. In the example shown in FIGS. 3 through 10, questions are displayed which may assist the operator in helping a customer select a particular menu item.

A fourth display portion 74 displays available control options 76 to control the food ordering terminal assembly 10 and any non-food ordering systems that may be controlled through the food ordering terminal assembly 10. Such available control options 76 include order management, drawer management, order holding, cancelling orders, a no sale option, system management, personnel time clock options, and operator logging in and logging out options. The processing unit 22 controls which of these available control options 76 are displayed in the fourth display portion 74 based on where in the selection process the food item process is currently in. For example, FIG. 3 does not show the option to hold an order or cancel an order because those options are not available to someone that has not initiated an order to the point where a full item is selected. The fourth display portion 74 is also stationary within the display component 26.

Method of Operation

Figure 11:
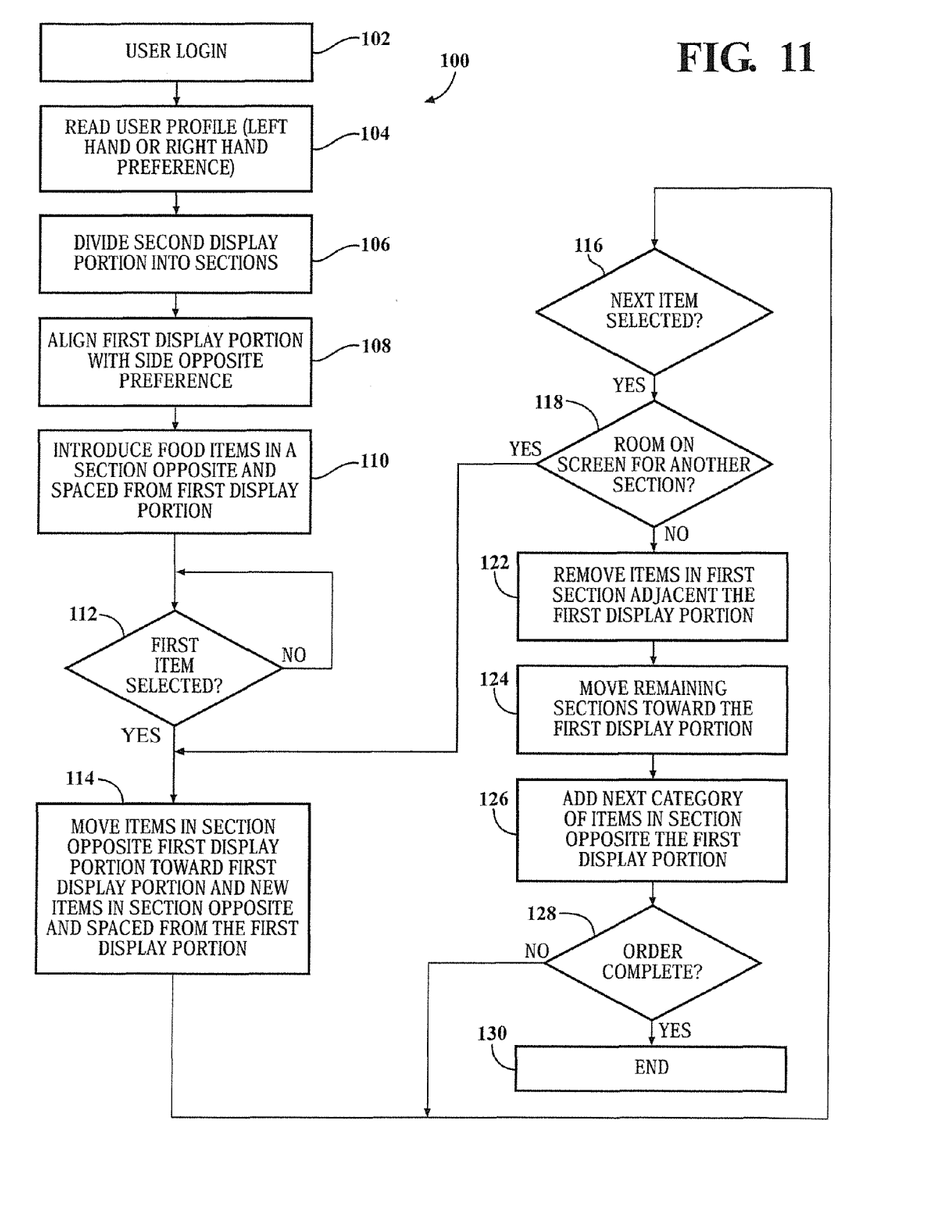
FIG. 11 is a logic chart of one embodiment of a method incorporating the invention.

Referring to FIG. 11, a method for operating the food ordering terminal assembly 10 is generally indicated at 100. The operation begins with an operator logging in at 102. Preferences are read based on the operator logging in at 104. Preferences may include the color of the screen or highlights. In addition, a profile of an operator may include whether the operator is a right handed person or a left handed person so that the screen may cascade from right-to-left or left-to-right, depending thereon. Other such profile preferences may be stored in the operator's profile to assist the operator in operating the food ordering terminal assembly 10.

Once the profile of the operator is loaded, the display component 26 is divided into sections at the first display portion 34 is aligned opposite the preference of the operator at 108. More specifically is designated that he or she is right handed the first display portion is aligned on the left side 36 of the display component 26. This allows the operator to use his or her right hand to select items and not ever have the tally (first display portion 34) obscured thereby.

Food items are introduced in the section opposite and spaced from the first section at 110. In the example shown in FIGS. 3 through 10, this section is defined as the right-most column 52. The method then determines whether the first item is selected at 112. If not, the same food items are maintained in the first section 52 of the display component 26. If the first item is selected, the items in the first section are moved to a second section disposed adjacent the first section, namely the middle column 48 at 114. It is then determined whether the next item is selected at 116 which is displayed in the right-most column 52 after the items that were previously in the right-most column 52 were cascaded to the middle column 48. If not, the system waits for a selection to be made. If so, it is determined whether there is room on the display component 26 for another section at 118. If so, the food items are cascaded to the next section disposed adjacent the section in which they were previously shown at 114 and new items are moved into the first section (right-most-column 52). If it is determined that the display component 26 has all of its sections 42 filled with items, the oldest section for item selection (left-most column 44) is removed at 122 and the remaining sections are cascaded to the sections 42 disposed adjacent thereto at 124. A new category of food items is displayed in the right-most section 52 of the second display portion 38 at 126. It is then determined whether the order is complete at 128. If not, the method returns to decision diamond 116 to determine whether another item has been selected. And if the order is complete, the method terminates at 130.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A food ordering terminal assembly for ordering selected food items from available items, the food ordering terminal assembly comprising:
    a processing unit for processing food orders;
    a memory unit electrically connected to the processing unit for storing data therein;
    an input device electrically connected to the processing unit to enter the food order for the selected food items; and
    a display operatively connected to the processing unit to display (i) a first set of the available items, (ii) the selected food items, and (iii) a tally of costs associated with the selected food items, wherein:
    the display includes (i) a first display portion for displaying the tally of costs and (ii) a second display portion for displaying the first set of the available items,
    the first display portion is fixed with respect to the display, and
    the second display portion is divided into a plurality of sections including a first section and a second section,
    in response to selection of one of the first set of the available items, the first set of the available items moves across the second display portion from the first section to the second section such that (i) a second set of the available items appears for consideration and selection in the first section, and (ii) in the second section, the first set of the available items remains visible and available for reselection.

2. A food ordering terminal assembly as set forth in claim 1 wherein in response to selection of one of the available items presently displayed in the first section, the first set of the available items in the second display portion moves in a single direction relative to the display from one of the plurality of sections into an immediately adjacent one of the plurality of sections.

3. A food ordering terminal assembly as set forth in claim 2 wherein:
    a last one of the sections is disposed adjacent to the first display portion, and
    in response to selection of one of the available items presently displayed in the first section, ones of the available items presently displayed in the last one of the sections are removed from the second display portion.

4. A food ordering terminal assembly as set forth in claim 3 wherein:
    the first display portion includes a selection window to make a selection independent from the available items, and
    the selection in the selection window may be made at any time during the ordering of selected food items.

5. A food ordering terminal assembly as set forth in claim 4 wherein the display includes a third display portion to provide assistance in the ordering of selected food items.

6. A food ordering terminal assembly as set forth in claim 5 wherein the third display portion is stationary within the display.

7. A food ordering terminal assembly as set forth in claim 6 wherein the display includes a fourth display portion for displaying available control options to control the food ordering terminal assembly and non-food ordering systems.

8. A food ordering terminal assembly as set forth in claim 7 wherein the processing unit controls which options are displayed in the fourth display portion based on present contents of the first section of the display portion.

9. A food ordering terminal assembly as set forth in claim 8 wherein the fourth display portion is stationary within the display.

10. A food ordering terminal assembly as set forth in claim 9 wherein the input device is integrated with the display.

11. A method for controlling a food ordering terminal assembly having a display extending between a first side and a second side parallel to the first side, the method comprising:
    dividing the display into a first display portion and a second display portion;
    dividing the second display portion into a plurality of sections including a first section and a second section immediately adjacent to the first section;
    aligning the first display portion along the first side of the display;
    introducing a first set of food items for selection in the first section along the second side of the display such that the first display portion and the first section are spaced apart from each other; and
    in response to selection of one of the first set of the food items moving the first set of the food items across the second display portion from the first section to the second section such that (i) a second set of food items appears for consideration and selection in the first section, and (ii) in the second section, the first set of the food items remains visible and available for reselection.

12. A method as set forth in claim 11 wherein a third section of the plurality of sections is disposed adjacent to the first display portion.

13. A method as set forth in claim 12 further comprising, in response to selection of a food item presently displayed in the first section, removing, from the second display portion, food items presently displayed in the third section.

14. A method as set forth in claim 13 wherein each of the plurality of sections of the second display portion are columns.

15. A method as set forth in claim 13 wherein the first side of the display is a left side of the display and the second side of the display is a right side of the display.

* * * * *